(12) United States Patent
Hyytiainen

(10) Patent No.: US 10,003,935 B2
(45) Date of Patent: Jun. 19, 2018

(54) SYSTEM AND METHOD FOR OPTIMIZING PUSH SERVICES IN CLOUD BASED MOBILE NETWORKS USING A SOFTWARE API DRIVEN APPROACH

(71) Applicant: NOKIA SOLUTIONS AND NETWORKS OY, Espoo (FI)

(72) Inventor: Jari Juhani Hyytiainen, Kerava (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 78 days.

(21) Appl. No.: 14/893,694

(22) PCT Filed: May 27, 2013

(86) PCT No.: PCT/EP2013/060825
§ 371 (c)(1),
(2) Date: Nov. 24, 2015

(87) PCT Pub. No.: WO2014/191010
PCT Pub. Date: Dec. 4, 2014

(65) Prior Publication Data
US 2016/0112847 A1    Apr. 21, 2016

(51) Int. Cl.
*H04W 68/00* (2009.01)
*H04W 4/12* (2009.01)
(Continued)

(52) U.S. Cl.
CPC .............. *H04W 4/12* (2013.01); *H04L 67/26* (2013.01); *H04W 68/00* (2013.01);
(Continued)

(58) Field of Classification Search
CPC ..... H04W 4/12; H04W 68/00; H04W 68/005; H04W 76/046; H04W 88/14; H04L 67/26
(Continued)

(56) References Cited

U.S. PATENT DOCUMENTS 9,155,064 B2 * 10/2015 Al .................... H04W 68/00
2010/0265884 A1 * 10/2010 Vikberg ................ H04W 4/14
370/328

(Continued)

FOREIGN PATENT DOCUMENTS

EP      2 536 230 A1   12/2012
WO   WO 2007/105888 A1    9/2007
WO   WO 2011/162667 A1   12/2011

OTHER PUBLICATIONS

International Search Report & Written Opinion dated Apr. 17, 2014 corresponding to International Patent Application No. PCT/EP2013/060825.

(Continued)

*Primary Examiner* — William Nealon
(74) *Attorney, Agent, or Firm* — Squire Patton Boggs (US) LLP

(57) ABSTRACT

A system and method for optimizing push services in mobile networks using a software API driven approach is provided. More particularly, an MME service is provided which includes a software API for controlling a subscriber's network and bearer states. The software API is called to trigger a paging procedure in the MME service without the interaction of the PGW and SGW, in order to move a subscriber's user equipment (UE) from an idle state to an active state. The MME service and/or the push service may be part of a cloud computing environment.

10 Claims, 3 Drawing Sheets

(51) Int. Cl.
*H04L 29/08* (2006.01)
*H04W 88/14* (2009.01)

(52) U.S. Cl.
CPC .......... *H04W 68/005* (2013.01); *H04W 76/27* (2018.02); *H04W 88/14* (2013.01)

(58) Field of Classification Search
USPC ........................................................ 455/458
See application file for complete search history.

(56) References Cited

U.S. PATENT DOCUMENTS

| 2011/0310804 | A1* | 12/2011 | Beygzadeh | ........... | H04W 68/00 |
| | | | | | 370/328 |
| 2012/0079082 | A1* | 3/2012 | Ding | ....................... | H04W 8/20 |
| | | | | | 709/220 |
| 2014/0169269 | A1* | 6/2014 | Salot | ..................... | H04W 48/20 |
| | | | | | 370/328 |

OTHER PUBLICATIONS

ETSI TS 123 401 V11.5.0 (Apr. 2013), Technical Specification, "LTE; General Packet Radio Service (GPRS) enhancements for Evolved Universal Terrestrial Radio Access Network (E-UTRAN) access (3GPP TS 23.401 version 11.5.0 Release 11)," European Telecommunications Standards Institute (ETSI), Apr. 1, 2013, XP014156392, 288 pages.

* cited by examiner

SYSTEM AND METHOD FOR OPTIMIZING PUSH SERVICES IN CLOUD BASED MOBILE NETWORKS USING A SOFTWARE API DRIVEN APPROACH

TECHNICAL FIELD

The instant invention relates to a novel mechanism for optimizing push services in cloud based mobile networks and, more particularly, to a system and method for optimizing push services in cloud based mobile networks using a software API driven approach.

Referring now to FIG. 1, there is shown one particular embodiment of an LTE mobile packet network. Whereas UTRAN (UMTS Terrestrial Radio Access Network) and GERAN (GPRS EDGE Radio Access Network) networks provide user equipment connectivity using the SGSN (Serving GPRS Support Node), the LTE network of FIG. 1 utilizes an evolved packet core (EPC) architecture for connecting user equipment (UE) to the core network (i.e., the Operator's IP Services, for example, IMS, PSS, etc). In such a system, control information is exchanged between the E-UTRAN node B (E-UTRAN or eNB) and an MME (Mobility Management Entity) in accordance with the S1-AP protocol on the S1-MME interface. The MME is responsible for control plane functionality including, among other things, UE idle mode tracking and paging procedure. The MME is also involved in the bearer activation/deactivation process and is responsible for choosing the serving gateway (SGW) for a UE at the initial attach and at the time of an intra-LTE handover involving core network (CN) node relocation. The E-UTRAN communicates with the SGW via the S1-U interface. The SGW routes and forwards user data packets to the PDN Gateway (PGW), which provides connectivity from the UE to external packet data networks. Additionally, for idle state UEs, the SGW terminates the downlink data path and handles paging when downlink data arrives for the UE.

Currently in LTE systems, there is a desire on the radio interface side of the network to force subscribers to make idle-active transitions rapidly, due to the high license costs of simultaneously connected users in eNB software. Normally there seems to be an inactivity period timer of between 5 and 20 s for data transmission in the eNB. When this timer expires, the eNB releases the S1 connection towards the core network (S1-U interface) and, thus, puts the subscriber UE in an IDLE state.

If one or more services (e.g., push email) want to send data to an idle subscriber UE, there is a need to establish S1 connectivity using the paging procedure defined in the 3GPP standard. This creates a huge signaling load on the core network elements, especially in an EPC domain. Additionally, multiple elements handling paging signaling
  introduces additional latency into the system,
  affects buffer sizing in all elements, and
  exposes a denial-of-service like interface in the EPC, as there could be malware just sending dummy packets towards an EPC gateway's external IP range (i.e., port scanning).

Referring now to FIG. 2, there is shown a mobile packet network 100 having a traditional EPC network architecture for providing push notifications to a subscriber UE. Currently, mobile packet networks provide push services to subscribers wherein a request for a given transaction is initiated by the service (i.e., by a server associated with the service). For example, a client UE1 subscribes to one or more push services provided by one or more of the servers S1, S2, S3. In the present example, the server S3 provides an email service to which the user of UE1 subscribes.

Referring now to FIGS. 2 and 3, in accordance with its push email service, the server S3 wants to send email towards the mobile client UE1. To do so, a push notification is sent along the path P1 to the user equipment UE1 of the subscribing client. More particularly, the server S3 provides a push notification to the serving gateway SGW, via the PDN Gateway PGW. The push notification data packet is buffered by the serving gateway SGW, which sends a downlink data notification message towards an MME, in order to start a paging procedure via the eNB servicing UE1. UE1 responds to the paging message with a service request procedure, in order to move from idle to active.

DISCLOSURE OF THE INVENTION

The present invention provides a system and method for providing push services to a user with the reduced involvement of core network elements. In one particular embodiment of the invention, an MME service is provided which includes a software API for controlling a subscriber's network and bearer states. The software API triggers a paging procedure in the MME service without the interaction of the PGW and SGW, in order to move a subscriber's user equipment (UE) from an idle state to an active state.

In another particular embodiment of the invention, the MME service including the software API is part of a cloud computing environment.

Although the invention is illustrated and described herein as embodied in a system and method for optimizing push services in cloud based mobile networks using a software API driven approach, it is nevertheless not intended to be limited to the details shown, since various modifications and structural changes may be made therein without departing from the spirit of the invention and within the scope and range of equivalents of the claims.

The construction of the invention, however, together with the additional objects and advantages thereof will be best understood from the following description of the specific embodiments when read in connection with the accompanying drawings.

BRIEF DESCRIPTION OF THE DRAWINGS:

The present invention is illustrated by way of example, and not by way of limitation, in the figures of the accompanying drawings, in which like reference numerals refer to similar elements and in which.

Figure 4:
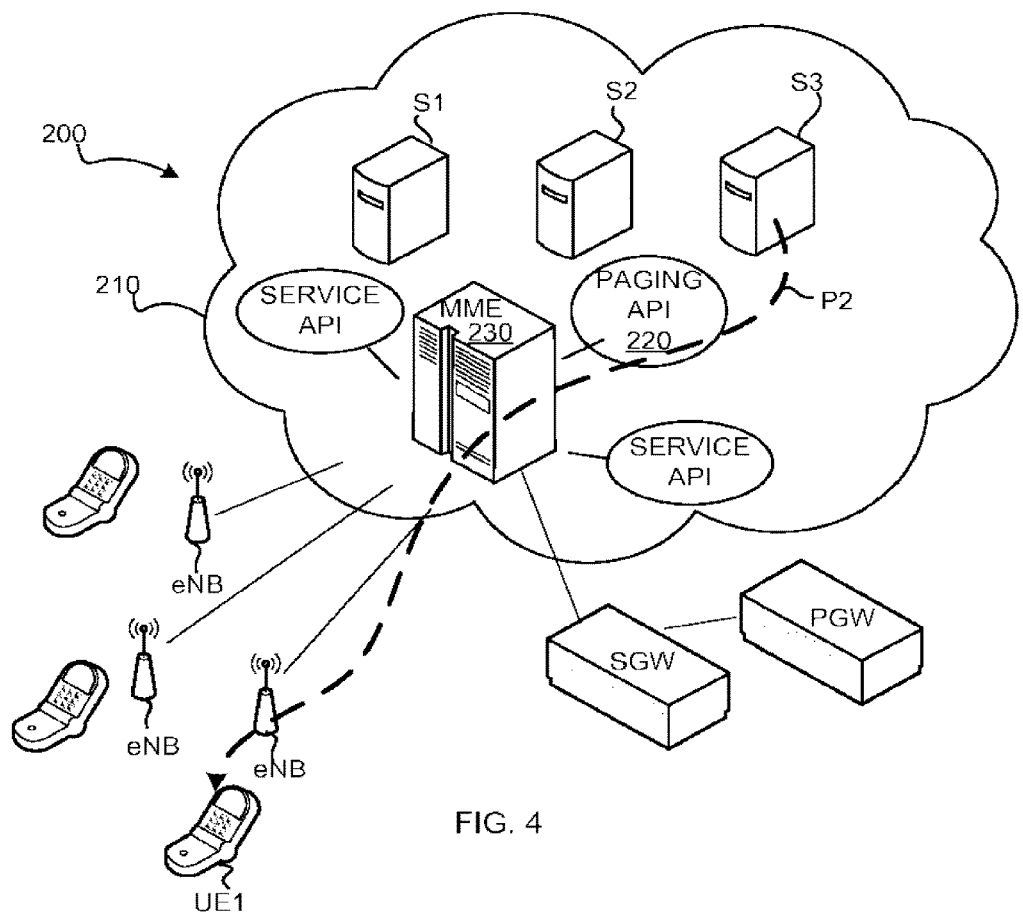
FIG. 4 is a simplified block diagram illustrating an exemplary software driven, cloud optimized paging architecture in accordance with one particular embodiment of the present invention.
Figure 5:
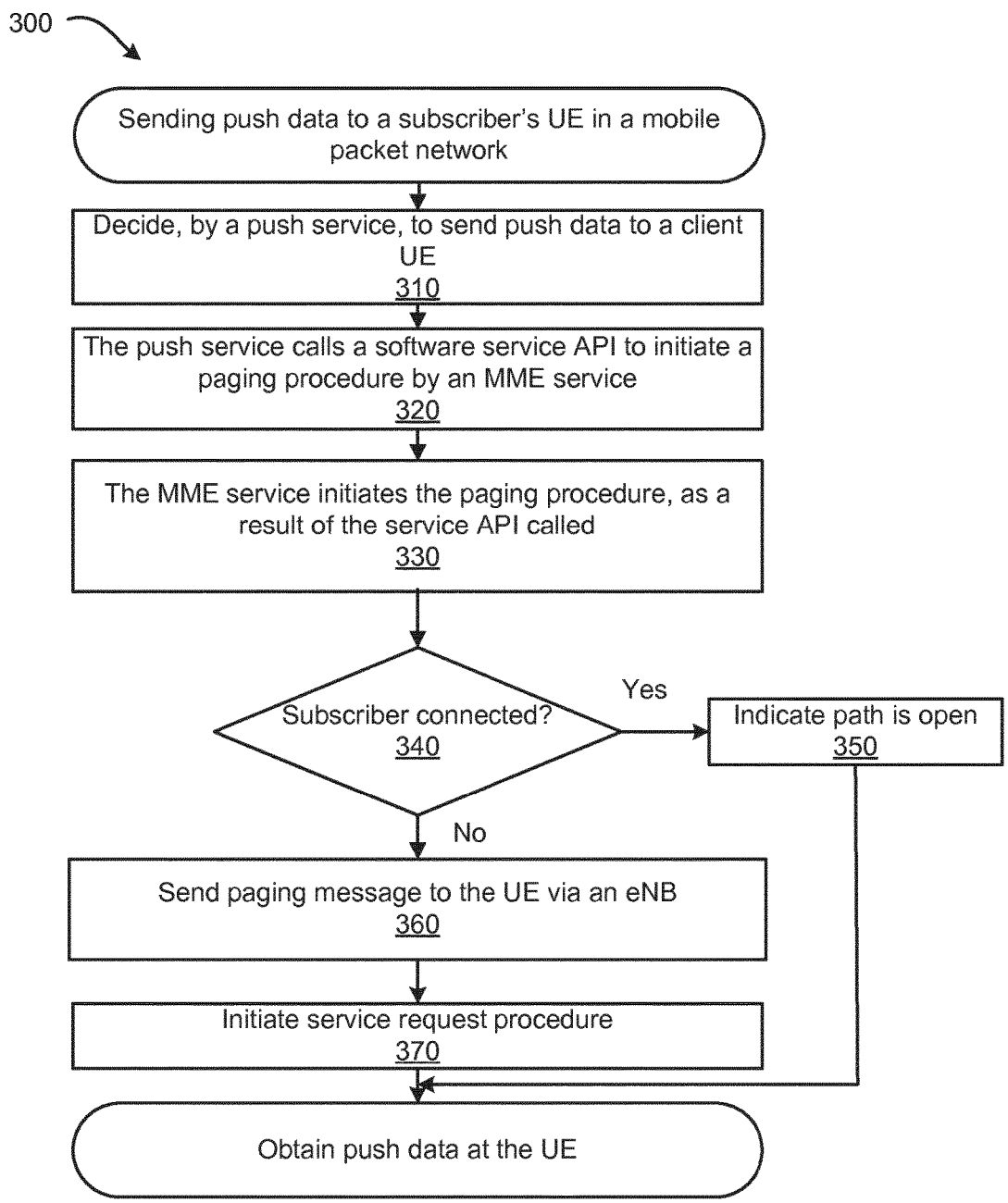
FIG. 5 is a block diagram illustrating a method for initiating a push service in accordance with one particular embodiment of the present invention.

DETAILED DESCRIPTION OF THE INVENTION:

Referring now to FIGS. 4 and 5, there is shown one particular embodiment of a mobile packet network system having a software driven, cloud optimized paging architecture for co-located services in a data center and method 300 for use thereof. More particularly, following software-defined networking (SDN) principles, a cloud service is provided that includes a software application-programming-interface (API) for controlling subscribers' network & bearer states. In one particularly preferred embodiment of the invention, a Flexi NS—MME cloud service, made by Nokia Siemens Networks, is provided as the MME 230 in the cloud computing environment 210. This is not meant to be limiting, however, as other types of cloud services and servers may be used.

Referring back to FIGS. 4-5, a cloud computing environment 210 is provided including a cloud-based MME and a number of software service APIs for handling the different push services S1, S2, S3 provided to subscribers. In one particular embodiment of the invention, the push services S1, S2 and S3 are co-located services in a data center. In another particular example of the invention, the server S3 provides a push email service to which the user of UE1 subscribes. Note that it is for exemplary purposes only that push service S3 will be described as being a push email service. It should be understood that this is not meant to be limiting, as the invention will, of course, be useful in connection with other types of push services.

Figure 2:
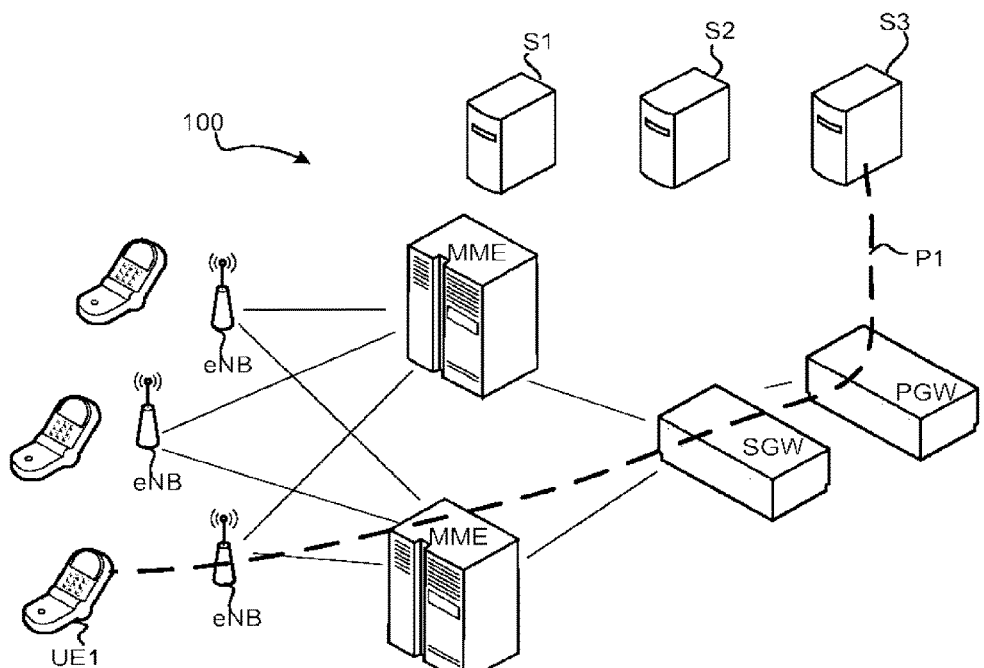
FIG. 2 is a simplified block diagram of a network architecture for providing push services to a subscriber in accordance with the prior art.
Figure 3:
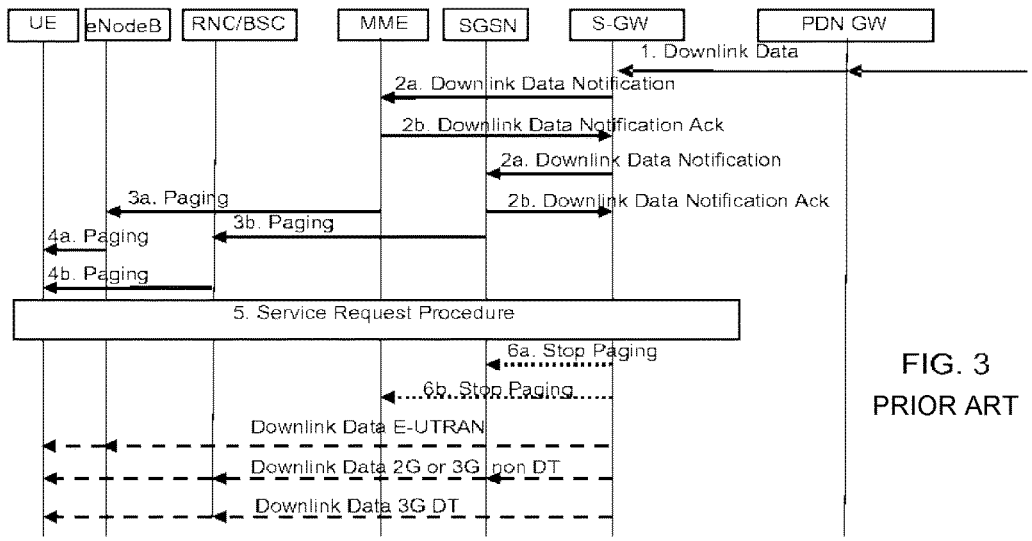
FIG. 3 is a is a generalized interaction diagram for a method of performing a network triggered push service request in accordance with the prior art.

More particularly, as with the system of FIG. 2, in accordance with its push email service, the push service or server S3 wants to send email towards the mobile client user equipment or user device UE1. Step 310. To do so, however, a push email notification is now sent along the path P2 to the UE1. In accordance with the present invention, the server S3 calls a cloud-based MME service software API associated with the server S3. Step 320. This software API would act as an additional layer on top of the other functionality provided by the MME cloud service 230.

In the present particular example, the server S3 calls the Paging API 220, which is an API service of the MME that triggers a paging procedure without requiring any interaction from the PGW and SGW to move the subscriber device UE1 state from IDLE to ACTIVE. Step 330. In one particular embodiment of the invention, the Paging API 220 is an SSL secured REST API for paging services, which, in conjunction with the MME cloud service, can be used to control network and bearer states. If desired, the Paging API 220 can be called with multiple subscriber IDs and/or subscriber names. Other types of service APIs can be used in the cloud computing environment 210 to perform other types of similar services.

Figure 1:
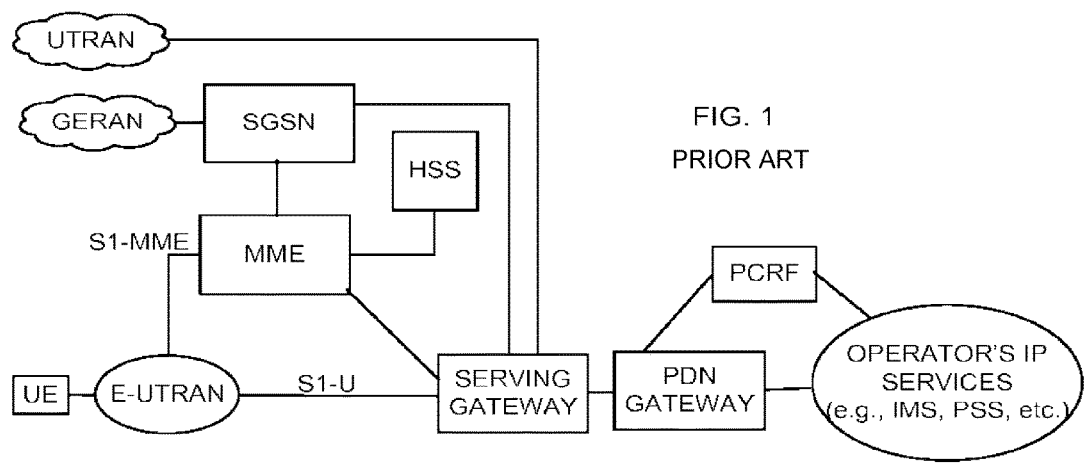
FIG. 1 is a simplified block diagram of a system architecture for a mobile packet network.

Once the Paging API 220 has been called by the push service S3 and the paging procedure initiated, the MME service 230 checks whether or not the subscriber is in a CONNECTED state. Step 340. If it is determined that the user is CONNECTED, the MME service 230 provides a return value explaining that the path is open and that the push service can send downlink data towards the client UE1. Step 350. Otherwise, a paging message is sent by the MME cloud service 230 to all eNBs in the tracking area(s). The client user equipment UE1 receives the paging message via the eNB servicing UE1. Step 360. UE1 responds to the paging message with a service request procedure in order to move from IDLE to ACTIVE. Step 370. Ultimately, the downlink data from the push service S3 is obtained at the UE, via the eNB. It should be noted that, in a cloud computing environment, MME service scalability means that the cloud-based MME service 230 can offer a single contact point for the external services. Thus, mobility between separate MME boxes disappears (compare FIG. 1).

Thus, a subscriber push service S1, S2, S3 can communicate with the client via a cloud-based MME service API, such as paging API 220 of FIG. 4. In this way, the signalling load on the core network related to paging (i.e., in particular, to the active-idle change triggered by network) is completely removed from the PGW and SGW elements of the EPC. This additionally provides a more secure mechanism for triggering a paging procedure, as REST interface is secured with SSL principles. Messaging latency is improved and gateway resources can be allocated for packet handling. It is important to note that, although discussed in connection with an email service, the optimization principles of the present invention can be utilized for all push services that need instant access to modify a subscriber's state information in a mobile network, including, but not limited to, Voice over LTE (VoLTE) calls. It should be noted that the present invention can be implemented in a system, such as the system of FIG. 1, without making any changes to the current 3GPP specifications. Additionally, if a push service does not integrate with a software API in accordance with the present invention, that push service can still continue sending notification packets via the EPC gateways (PGW and SGW), as currently done.

With the introduction of software APIs in accordance with the present invention, interactions between IT applications and mobile network applications are made much more flexible, thus expanding the innovation possibilities in the future.

It should be understood that the network devices or network elements and their functions described herein may be implemented by software, e.g. by a computer program product for a computer, or by hardware. In any case, for executing their respective functions, correspondingly used devices, such as the user equipment, access nodes, MME, SGW, PGW, CEM, location server, etc., include several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. USB memory stick, CD-ROM, EEPROM, and the like), user interface means for providing monitor and manipulation possibilities to a user (e.g. a screen, a keyboard, a mouse, a touchscreen and the like), interface means for establishing links and/or connections under the control of the processor unit (e.g. wired and wireless interface means, an antenna, etc.) and the like.

For the purpose of the present invention as described herein above, it should be noted that:
an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, NFC (Near Field Communication), and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto;

usable access networks may be any device, apparatus, unit or means by which a station, entity or other user equipment may connect to and/or utilize services offered by the access and transport network; such services include, among others, data and/or (audio-) visual communication, data download etc.;

a user equipment may be any device, apparatus, unit or means by which a system user or subscriber may experience services from an access and transport network, such as a mobile phone, tablet, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

It should be noted, that reference signs in the claims shall not be construed as limiting the scope of the claims. Additionally, although the invention is illustrated and described herein as embodied in a system and method for optimizing push services in cloud based mobile networks using a software API driven approach, it is nevertheless not intended to be limited to only these details shown, as various modifications and structural changes may be made therein without departing from the spirit of the invention and within the scope and range of equivalents of the claims.

I claim:

1. A method for initiating a push procedure to a user equipment in a mobile packet network, comprising the steps of:
    deciding, by a push service, to send push data to the user equipment;
    calling, with the push service, a mobility management entity (MME) service application programming interface (API), resulting in a paging procedure being initiated by an MME; and
    sending a paging message from the MME to the user equipment, wherein
    the paging procedure is initiated without interaction with a serving gateway (SGW) and packet data network (PDN) gateway (PGW) of the mobile packet network,
    the push service is one of a plurality of co-located services in a data center, and the MME service API includes a plurality of service APIs called by the plurality of co-located services, and
    one or more of the plurality of service APIs can be called with one or more subscriber IDs or subscriber names.

2. The method according to claim 1, wherein the MME is an MME service operating in a cloud computing environment.

3. The method according to claim 1, wherein the paging procedure includes the step of checking whether or not the user equipment is connected.

4. The method according to claim 1, further comprising the steps of:
    initiating a service request procedure in response to the paging message; and
    obtaining, at the user equipment, downlink data from the push service.

5. The method according to claim 1, wherein the MME service provides the paging message to the user equipment via an evolved universal mobile telecommunications system terrestrial radio access network (E-UTRAN) or evolved node B (eNB).

6. The method according to claim 1, wherein the mobile packet network is an evolved packet core network in accordance with the 3GPP standard.

7. A system for initiating a push procedure to a user equipment in a mobile packet network, comprising:
a push service providing push data for a subscriber;
a mobility management entity (MME) configured to perform a paging procedure, wherein
said MME includes at least one MME service application programming interface (API) called by the push service to cause said MME to perform said paging procedure,
the paging procedure is initiated by the push service calling the at least one MME service API without interaction with a serving gateway (SGW) and packet data network (PDN) gateway (PGW) of the mobile packet network,
the push service is one of a plurality of co-located services in a data center, and the MME service API includes a plurality of service APIs called by the plurality of co-located services, and
one or more of the plurality of service APIs can be called with one or more subscriber IDs or subscriber names.

8. The system according to claim 7, wherein the MME is an MME service operating in a cloud computing environment.

9. The system according to claim 7, wherein the MME service provides the paging message to the user equipment via an evolved universal mobile telecommunications system terrestrial radio access network (E-UTRAN) or evolved node B (eNB).

10. A mobility management entity (MME) cloud server, comprising:
at least one MME service application programming interface (API) for initiating a paging procedure;
the at least one MME service API being called by a push service in communication with the MME cloud server; and
the MME cloud server configured to send a paging message to a user equipment in
response to the at least one MME service API being called, wherein
the paging procedure is initiated without interaction with a serving gateway (SGW) and packet data network (PDN) gateway (PGW) of the mobile packet network, and
each of the at least one MME service APIs initiating a paging procedure when called by a particular one of a plurality of co-located services in a data center.

* * * * *